US010689994B2

(12) United States Patent
Albert et al.

(10) Patent No.: US 10,689,994 B2
(45) Date of Patent: Jun. 23, 2020

(54) SEAL ASSEMBLY TO SEAL CORNER LEAKS IN GAS TURBINE

(71) Applicant: General Electric Company, Schenectady, NY (US)

(72) Inventors: Jason Edward Albert, Greenville, SC (US); Bodhayan Dev, Niskayuna, NY (US); Neelesh Nandkumar Sarawate, Niskayuna, NY (US); Michael John Brown, Columbia, SC (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 15/087,352

(22) Filed: Mar. 31, 2016

(65) Prior Publication Data

US 2017/0284214 A1     Oct. 5, 2017

(51) Int. Cl.
  *F16J 15/44*     (2006.01)
  *F01D 11/00*     (2006.01)
  *F01D 25/12*     (2006.01)

(52) U.S. Cl.
  CPC ............ *F01D 11/005* (2013.01); *F01D 25/12* (2013.01); *F16J 15/442* (2013.01); *F05B 2220/302* (2013.01); *F05B 2230/60* (2013.01); *F05B 2240/57* (2013.01)

(58) Field of Classification Search
  CPC ....... F01D 11/005; F01D 25/12; F16J 15/442; F05B 2230/60; F05D 2230/60; F05D 2240/11; F05D 2240/55
  USPC ........................................ 415/135, 138, 139
  See application file for complete search history.

(56) References Cited

U.S. PATENT DOCUMENTS

| 3,501,246 A | * | 3/1970 | Hickey ................. F01D 11/025 |
| | | | 277/416 |
| 4,088,422 A | * | 5/1978 | Martin ..................... F01D 5/06 |
| | | | 415/173.7 |
| 5,154,577 A | | 10/1992 | Kellock et al. |
| 5,320,488 A | * | 6/1994 | Meade .................... F01D 5/025 |
| | | | 415/173.7 |
| 5,762,472 A | | 6/1998 | Pizzi et al. |
| | | | (Continued) |

OTHER PUBLICATIONS

Aksit et al., "Parasitic corner leakage reduction in gas turbine nozzle-shroud inter-segment locations", Joint Propulsion Conferences, 37th Joint Propulsion Conference and Exhibit, American Institute of Aeronautics and Astronautics.

*Primary Examiner* — Kristina R Fulton
*Assistant Examiner* — L. Susmitha Koneru
(74) *Attorney, Agent, or Firm* — Ann Agosti (57) ABSTRACT

Various embodiments include gas turbine seals and methods of forming such seals. In some cases, a turbine includes: a first arcuate component adjacent to a second arcuate component, each arcuate component including one or more slots located in an end face, each of the one or more slots having a plurality of axial surfaces and radially facing surfaces extending from opposite ends of the axial surfaces and a seal assembly disposed in the slot. The seal assembly including a backup intersegment seal disposed in the slot on a high-pressure side of the slot and a shim seal disposed in the slot over the backup intersegment seal and covering the backup intersegment seal on a low-pressure side of the slot. The shim seal including one or more shim seal segments and having a gap formed between each of the one or more shim seal segments.

12 Claims, 9 Drawing Sheets

(56) References Cited

U.S. PATENT DOCUMENTS

| | | | |
|---|---|---|---|
| 5,868,398 A | 2/1999 | Maier et al. | |
| 6,048,170 A * | 4/2000 | Dodd | F01D 11/005 |
| | | | 415/135 |
| 6,769,865 B2 * | 8/2004 | Kress | F01D 9/04 |
| | | | 415/113 |
| 7,513,740 B1 * | 4/2009 | Hervy | F01D 11/005 |
| | | | 415/173.1 |
| 8,075,255 B2 | 12/2011 | Morgan | |
| 8,608,436 B2 * | 12/2013 | Wines | F01D 5/066 |
| | | | 415/174.2 |
| 8,753,073 B2 * | 6/2014 | Albers | F01D 11/125 |
| | | | 415/139 |
| 8,985,592 B2 * | 3/2015 | Green | F01D 9/023 |
| | | | 277/637 |
| 8,998,573 B2 * | 4/2015 | Albers | F01D 11/005 |
| | | | 415/139 |
| 9,243,505 B2 | 1/2016 | Vassiliev et al. | |
| 2005/0004810 A1 * | 1/2005 | Tanaka | F01D 9/04 |
| | | | 415/173.1 |
| 2010/0247300 A1 * | 9/2010 | Morgan | F01D 11/005 |
| | | | 415/182.1 |
| 2011/0070079 A1 * | 3/2011 | Vest | F01D 11/005 |
| | | | 415/214.1 |
| 2014/0348642 A1 * | 11/2014 | Weber | F01D 11/005 |
| | | | 415/170.1 |
| 2015/0098808 A1 | 4/2015 | Morgan et al. | |
| 2015/0118042 A1 * | 4/2015 | Morgan | F01D 11/005 |
| | | | 415/214.1 |
| 2016/0024951 A1 * | 1/2016 | Sarawate | F16J 15/02 |
| | | | 415/214.1 |

* cited by examiner

SEAL ASSEMBLY TO SEAL CORNER LEAKS IN GAS TURBINE

BACKGROUND

The subject matter disclosed herein relates to turbines. Specifically, the subject matter disclosed herein relates to seals in gas turbines.

The main gas-flow path in a gas turbine commonly includes the operational components of a compressor inlet, a compressor, a turbine and a gas outflow. There are also secondary flows that are used to cool the various heated components of the turbine. Mixing of these flows and gas leakage in general, from or into the gas-flow path, is detrimental to turbine performance.

The operational components of a gas turbine are contained in a casing. The turbine is commonly surrounded annularly by adjacent arcuate components. As used herein, the term "arcuate" may refer to a member, component, part, etc. having a curved or partially curved shape. The adjacent arcuate components include outer shrouds, inner shrouds, nozzle blocks, and diaphragms. The arcuate components may provide a container for the gas-flow path in addition to the casing alone. The arcuate components may secure other components of the turbine and may define spaces within the turbine. Between each adjacent pair of arcuate components is a space or gap that permits the arcuate components to expand as the operation of the gas turbine forces the arcuate components to expand.

Typically, one or more slots are defined on the end faces of each arcuate component for receiving a seal in cooperation with an adjacent slot of an adjacent arcuate component. The seal is placed in the slot to prevent leakage between the areas of the turbine on either side of the seal. These areas may include the main gas-flow path and secondary cooling flows.

In some embodiments, multiple slots within the end of a particular arcuate component may connect one to another. Furthermore, multiple slots within the end of a particular arcuate component may be angled in orientation to each other. Typically a planar seal is received in each of the slots that are connected. Each of the planar seals has ends, with the seals being positioned in each of the two slots in an end-to-end orientation. Each adjacent pair of the seal segments forms a seal intersection gap between the two seals. This seal intersection gap permits leakage between the internal and external areas of the gas turbine component. Reducing this gap improves gas turbine performance.

BRIEF DESCRIPTION

Various embodiments of the disclosure include gas turbine seal assemblies and methods of forming such seals. In accordance with one exemplary embodiment, disclosed is a seal assembly to seal a gas turbine hot gas path flow in a gas turbine. The seal assembly includes a shim seal and a backup intersegment seal. The shim seal including a plurality of shim seal segments and having a gap formed between adjacent segments of the plurality of shim seal segments. The shim seal is disposed in a slot, on a low-pressure side of the slot, wherein the slot includes a plurality of slot segments. The backup intersegment seal includes a plurality of backup seal segments defining one or more corner regions. The backup intersegment seal is disposed in the slot on a high-pressure side of the slot. The shim seal seals the one or more corner regions.

In accordance with another exemplary embodiment, disclosed is a gas turbine. The gas turbine includes a first arcuate component adjacent to a second arcuate component and a seal assembly. Each arcuate component includes one or more slots located in an end face. Each of the one or more slots has a plurality of substantially axial surfaces and one or more radially facing surfaces extending from opposite ends of the substantially axial surfaces. The seal assembly is disposed in the slot of the first arcuate component and the slot of the second arcuate component. The seal assembly includes a shim seal and a backup intersegment seal. The shim seal defines one or more shim seal segments and has a gap formed between each of the one or more shim seal segments. The shim seal is disposed on a low-pressure side of the one or more slots. The backup intersegment seal is disposed on a high-pressure side of the one or more slots and defines one or more corner regions.

In accordance with yet another exemplary embodiment, disclosed is a method of assembling a seal in a turbine. The method includes forming a seal assembly. The forming includes providing a shim seal and providing a backup intersegment seal. The shim seal defining one or more shim seal segments and having a gap formed between each of the one or more shim seal segment. The backup intersegment seal defining one or more corner regions. The method further includes applying the seal assembly to the turbine. The turbine includes a first arcuate component adjacent to a second arcuate component. Each arcuate component includes one or more slots located in an end face. Each of the one or more slots has a plurality of axial surfaces and radially facing surfaces extending from opposite ends of the axial surfaces. The applying includes inserting the seal assembly in a slot of the one or more slots such that the backup intersegment seal is disposed in the slot on each arcuate component on a high-pressure side of a hot gas path flow and in contact with the axial surfaces of the slots and extending over the radially facing surfaces of the slots and the shim seal is disposed in the slots over the backup intersegment seal and covering the backup intersegment seal on a low-pressure side of the gas turbine hot gas path flow. Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

As noted herein, the subject matter disclosed relates to turbines. Specifically, the subject matter disclosed herein relates to cooling fluid flow in gas turbines and the sealing within such turbines. In contrast to conventional approaches, various embodiments of the disclosure include gas turbomachine (or, turbine) static hot gas path components, such as nozzles and shrouds.

As denoted in these Figures, the "A" axis (FIG. 1) represents axial orientation (along the axis of the turbine rotor). As used herein, the terms "axial" and/or "axially" refer to the relative position/direction of objects along the axis A, which is substantially parallel with the axis of rotation of the turbomachine (in particular, the rotor section). As further used herein, the terms "radial" and/or "radially" refer to the relative position/direction of objects along an axis (not shown), which is substantially perpendicular with axis A and intersects axis A at only one location. Additionally, the terms "circumferential" and/or "circumferentially" refer to the relative position/direction of objects along a circumference (not shown), which surrounds axis A but does not intersect the axis A at any location. It is further understood that common numbering between the various Figures denotes substantially identical components in the Figures.

Figure 1:
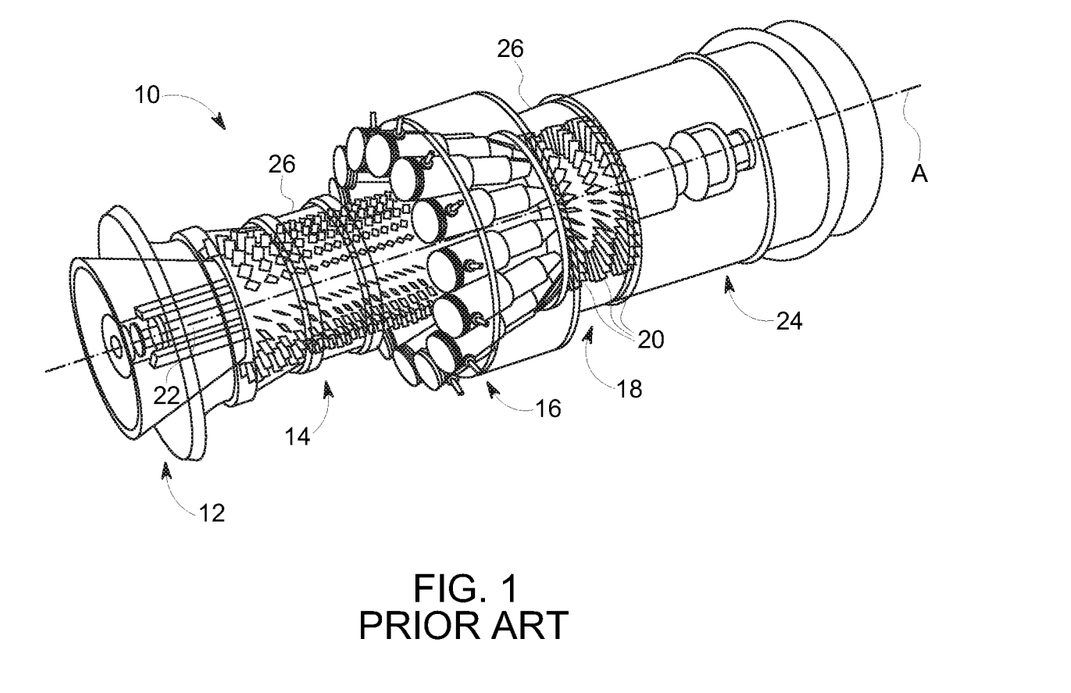
FIG. 1 shows a perspective partial cut-away view of a known gas turbine.

Referring to FIG. 1, a perspective view of one embodiment of a gas turbine 10 is shown. In this embodiment, the gas turbine 10 includes a compressor inlet 12, a compressor 14, a plurality of combustors 16, a compressor discharge (not shown), a turbine 18 including a plurality of turbine blades 20, a rotor 22 and a gas outflow 24. The compressor inlet 12 supplies air to the compressor 14. The compressor 14 supplies compressed air to the plurality of combustors 16 where it mixes with fuel. Combustion gases from the plurality of combustors 16 propel the turbine blades 20. The propelled turbine blades 20 rotate the rotor 22. A casing 26 forms an outer enclosure that encloses the compressor inlet 14, the compressor 14, the plurality of combustors 16, the compressor discharge (not shown), the turbine 18, the turbine blades 20, the rotor 22 and the gas outflow 24. The gas turbine 10 is only illustrative; teachings of the disclosure may be applied to a variety of gas turbines.

Figure 2:
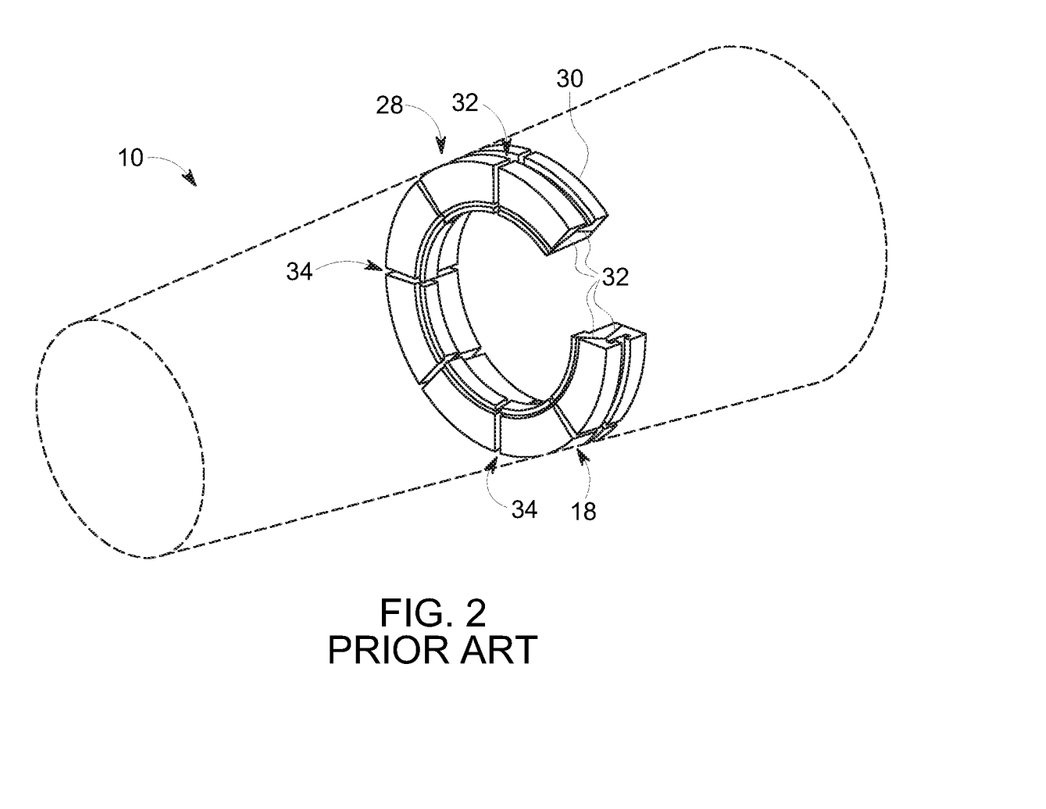
FIG. 2 shows a perspective view of known arcuate components in an annular arrangement.

In an embodiment, stationary components of each stage of a hot gas path (HGP) of the gas turbine 10 consists of a set of nozzles (stator airfoils) and a set of shrouds (the static outer boundary of the HGP at the rotor airfoils 20). Each set of nozzles and shrouds are comprised of numerous arcuate components arranged around the circumference of the hot gas path. Referring more specifically to FIG. 2, a perspective view of one embodiment of an annular arrangement 28 including a plurality of arcuate components 30 of the turbine 18 of the gas turbine 10 is shown. In the illustrated embodiment, the annular arrangement 28 as illustrated includes seven arcuate components 30 with one arcuate component removed for illustrative purposes. Between each of the arcuate components 30 is an inter-segment gap 34. This segmented construction is necessary to manage thermal distortion and structural loads and to facilitate manufacturing and assembly of the hardware.

A person skilled in the art will readily recognize that annular arrangement 28 may have any number of arcuate components 30; that the plurality of arcuate components 30 may be of varying shapes and sizes; and that the plurality of arcuate components 30 may serve different functions in gas turbine 10. For example, arcuate components in a turbine may include, but not be limited to, outer shrouds, inner shrouds, nozzle blocks, and diaphragms as discussed below.

Figure 3:
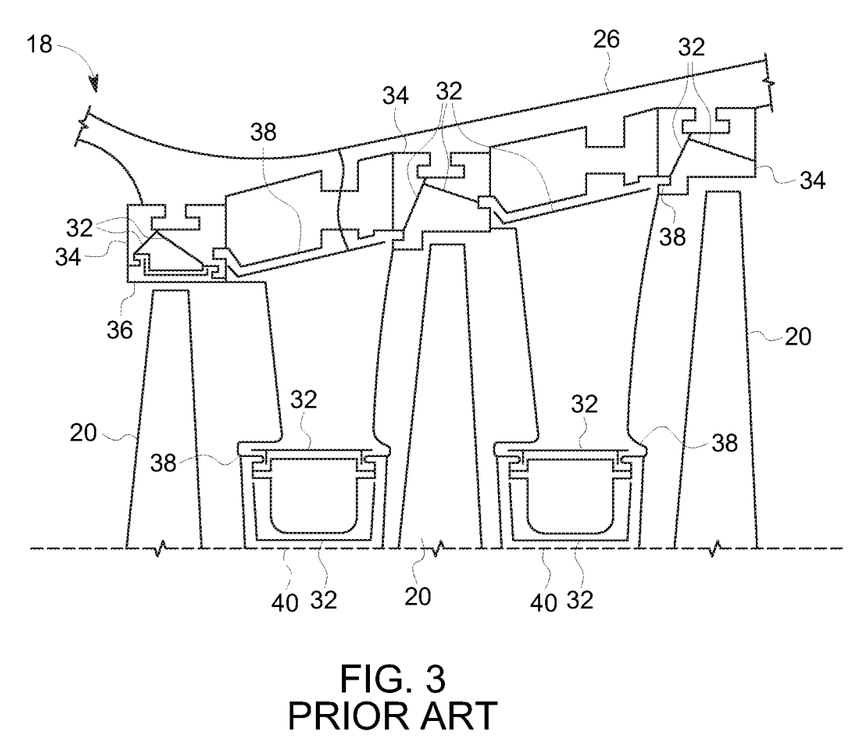
FIG. 3 shows a cross-sectional longitudinal view of a known turbine of a gas turbine.

Referring to FIG. 3, a cross-sectional view of one embodiment of turbine 18 of gas turbine 10 (FIG. 1) is shown. In this embodiment, the casing 26 encloses a plurality of outer shrouds 34, an inner shroud 36, a plurality of nozzle blocks 38, a plurality of diaphragms 40, and turbine blades 20. Each of the outer shrouds 34, inner shroud 36, nozzle blocks 38 and diaphragms 40 form a part of the arcuate components 30. Each of the outer shrouds 34, inner shrouds 36, nozzle blocks 38 and diaphragms 40 have one or more slots 32 in a side thereof. In this embodiment, the plurality of outer shrouds 34 connect to the casing 26; the inner shroud 36 connects to the plurality of outer shrouds 34; the plurality of nozzle blocks 38 connect to the plurality of outer shrouds 34; and the plurality of diaphragms 40 connect to the plurality of nozzle blocks 38. A person skilled in the art will readily recognize that many different arrangements and geometries of arcuate components are possible. Alternative embodiments may include different arcuate component geometries, more arcuate components, or less arcuate components.

Cooling air is typically used to actively cool and/or purge the static hot gas path (bled from the compressor of the gas turbine engine 10) leaks through the inter-segment gaps 34 for each set of nozzles and shrouds. This leakage has a negative effect on overall engine performance and efficiency because it is parasitic to the thermodynamic cycle and it has little if any benefit to the cooling design of the hot HGP component. As previously indicated, seals are typically incorporated into the inter-segment gaps 34 of static HGP components to reduce leakage. The one or more slots 32 provide for placement of such seals at the end of each arcuate component 30.

These inter-segment seals are typically straight, rectangular solid pieces of various types of construction (e.g. solid, laminate, shaped, such as "dog-bone"). The seals serve to seal the long straight lengths of the seal slots 32 fairly well, but they do not seal at the corners where adjacent seal slots intersect. The seals typically need to be shorter than the seal slots 32 to accommodate manufacturing variation and assembly constraints, resulting in the corner leaks being even larger. It is a significant benefit to engine performance and efficiency to seal these corner leaks more effectively. This is a challenging engine design detail because of numerous design constraints including the tight spaces in the inter-segment gaps 34 and seal slots 32, the need for relatively easy assembly and disassembly, thermal movement during engine operation, and the complicated route of leakage at the corner leaks. Previous attempts to minimize corner leakage have included the use of bent shim seals on the high-pressure side of the primary spline seals. However, effectiveness of this method of sealing the corner leakage was noted in that the shim seal was not located at the critical location (the low-pressure side of the seal slot 32).

Figure 4:
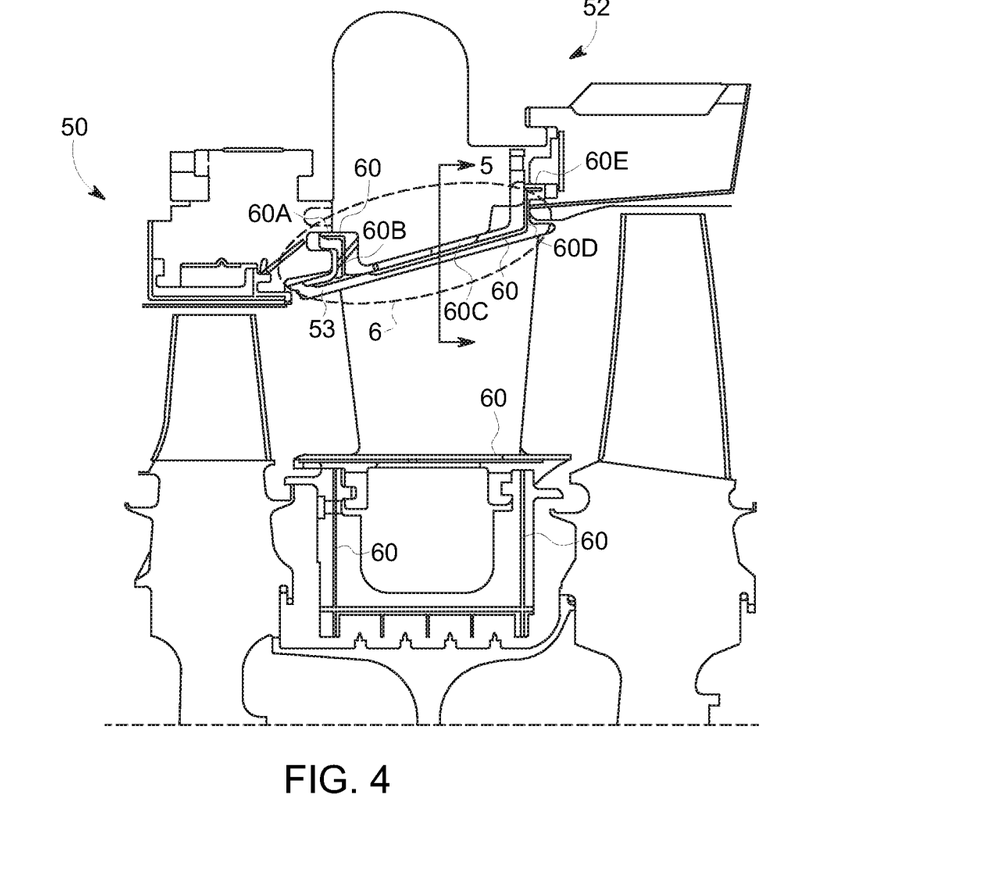
FIG. 4 shows a schematic cross-sectional view of a portion of a turbine, in accordance with one or more embodiments shown or described herein.
Figure 5:
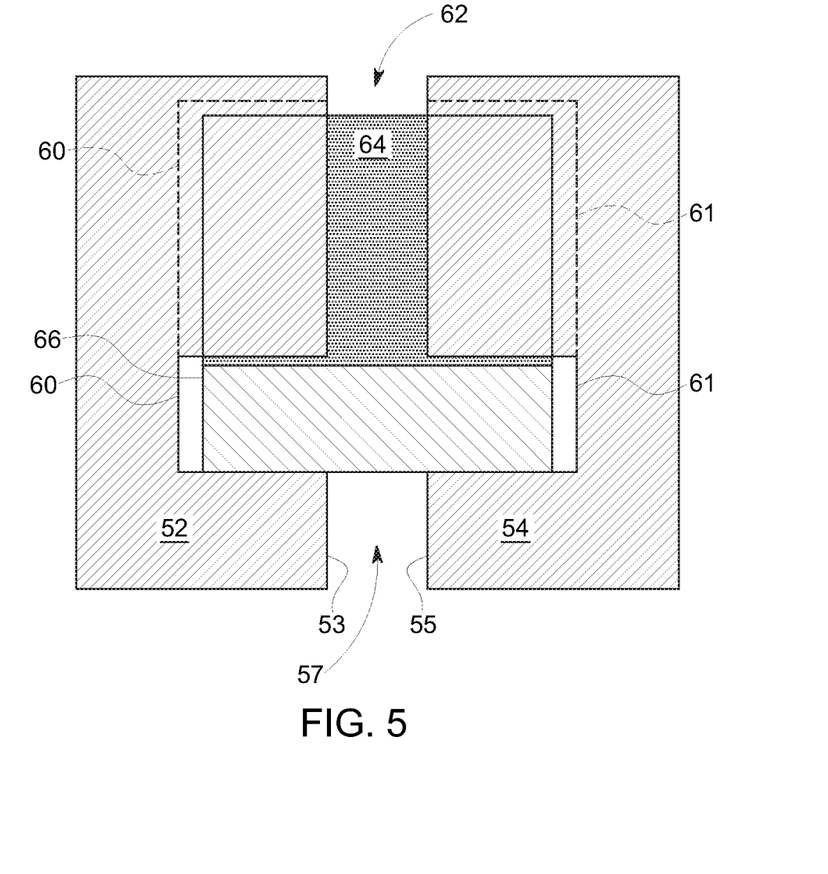
FIG. 5 shows a cross-sectional view of a seal assembly of FIG. 4 in relation to a first arcuate component and a second arcuate component, in accordance with one or more embodiments shown or described herein.
Figure 6:
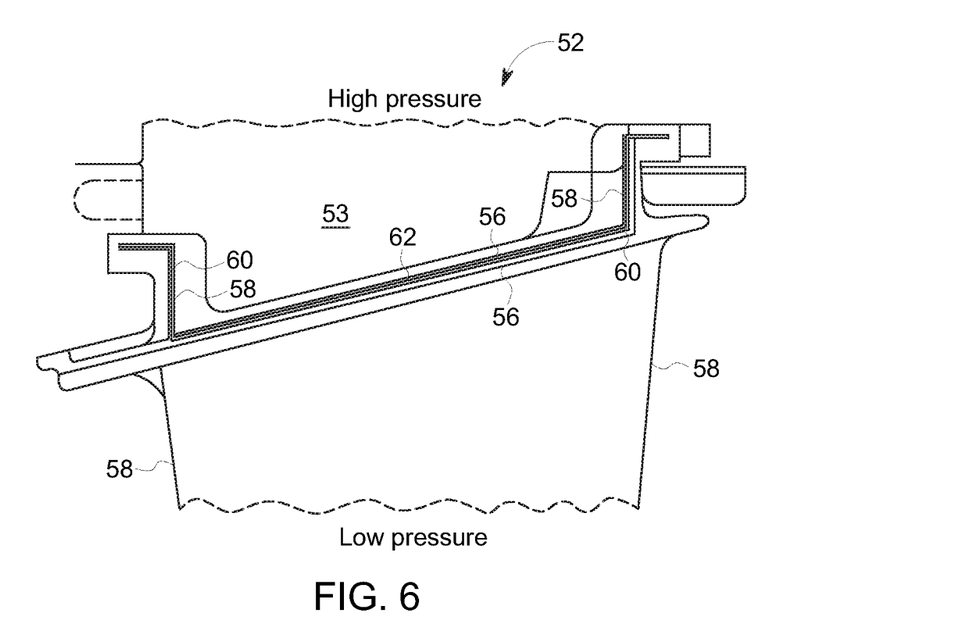
FIG. 6 shows a schematic cross-sectional view of a portion of the turbine of FIG. 4 as indicated by dashed line in FIG. 4, in accordance with one or more embodiments shown or described herein.
Figure 7:
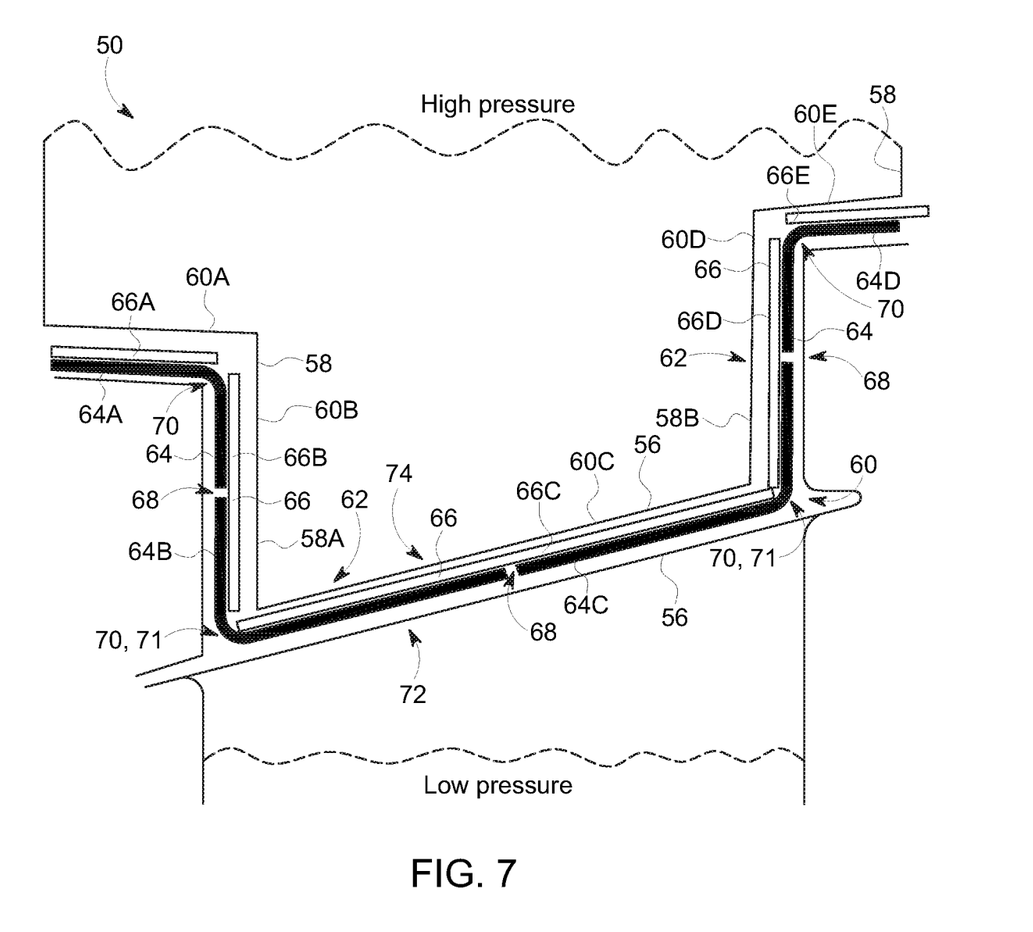
FIG. 7 shows a schematic cross-sectional view of the seal assembly of FIGS. 4-6, in accordance with one or more embodiments shown or described herein.

Turning to FIGS. 4-7, a cross-sectional longitudinal view of a gas turbine 50, generally similar to gas turbine 10 of FIGS. 1-3, is shown in FIG. 4, according to an embodiment. FIG. 4 shows an end view of an exemplary, and more particularly, a first arcuate component 52. FIG. 5 shows a cross-sectional view of the first arcuate component 52 and a second arcuate component 54, in spaced relation to one another. FIG. 6 shows an enlargement of a portion of the gas turbine engine 50, indicated by dashed line 6 in FIG. 4. FIG. 7 shows a further enlargement of the seal assembly as disclosed herein.

Referring more particularly to FIG. 4, the first arcuate component 52 includes a slot 60 formed in an end face 53 of the first arcuate component 52. The slot 60 may be comprised of multiple slot portions 60A, 60B, 60C, 60D, 60E, shown formed at an angle in relation to each other and connected to one another. The slot 60 may be comprised of any number of intersecting or connected slot portions.

FIG. 5 shows a cross-sectional axial view along line 5-5 of FIG. 4 of the first arcuate component 52 positioned adjacent to the second arcuate component 54. An intersegmental gap 57 is left between the first arcuate component 52 and the second arcuate component 54. An adjacent slot 61 on the second arcuate component 54 is shown. Similar to slot 60, the slot 61 may be formed of multiple slot portions formed at an angle in relation to each other and connected or intersecting to one another. Each slot 60, 61 includes a plurality of substantially axial surfaces 56 and a plurality of radially facing surfaces 58 extending from the end of the substantially axial surfaces 56, as best illustrated in FIGS. 4, 6 and 7, as shown in relation to slot 60. Alternate configurations and geometries of the slots 60, 61, including alternate seal slot geometry intersections, are anticipated by this disclosure.

In the illustrated embodiment of FIGS. 4-7, the gas turbine 50 includes a seal assembly 62 disposed in the one or more slots 60, 61, where the seal assembly 62 contacts adjacent cooperating slots 60, 61 at their axial surfaces 56, and extends over the radially facing surfaces 58. It should be understood that the description of the seal assembly 62 will be described below in relation to slot 60 of the arcuate component 52, but is similarly applicable to slot 61 of arcuate component 54 upon disposing therein the adjacent slots 60, 61.

As best illustrated in FIG. 7, the seal assembly 62 includes a shim seal 64 disposed on a low-pressure side 72 of the slot 60, and more particularly, on a low-pressure side 72 of each of the slot segments 60A, 60B, 60C, 60D, 60E, and a backup intersegment seal 66 disposed on a high-pressure side 74 of the slot 60, and more particularly, on a high-pressure-side 74 of each of the slot segments 60A, 60B, 60C, 60D, 60E. In an embodiment, the shim seal 64 is described as being disposed on a low-pressure side 72 of a hot gas path flow and a backup intersegment seal 66 is described as being disposed on a high-pressure side 74 of the hot gas path flow. It is understood that according to various embodiments, the backup intersegment seal 66 may include any type of planar seal, such as a standard spline seal, solid seal, laminate seal, shaped seal (e.g. dog-bone), or the like. In an embodiment, the backup intersegment seal 66 may be formed of a plurality of individual layers (e.g. laminate seal) that are only partially coupled to one another, thereby allowing for flexibility of the backup intersegment seal 66 (e.g., torsional movement).

In some cases, as shown in FIG. 7, the backup intersegment seal 66 includes a plurality of segments 66A, 66B, 66C, 66D and 66E where each segment is separated from its neighboring segment (e.g., 66A and 66B), with each disposed in one of the multiples slot segments 60A, 60B, 60C, 60D, 60E. It is anticipated that the backup intersegment seal 66 may be comprised of any number of segments, and that the five segment seal and cooperating slots of FIG. 7 are merely for illustrative purposes. Each segment 66A, 66B, 66C, 66D and 66E of the backup intersegment seal 66 may correspond with a distinct surface of the slot 60 (e.g., segment 66B corresponds with a first radially facing surface 58A of the slot segment 60B, segment 66C corresponds with axial surface 56 of the slot segment 60C and segment 66D corresponds with a second radially facing surface 58B of the slot segment 60D, etc.). In some particular embodiments, the backup intersegment seal 66 has a thickness of approximately 1.016 millimeters to approximately 2.54 millimeters. The plurality of backup seal segments 66A, 66B, 66C, 66D and 66E define seal intersection gaps 71 between neighboring segments at one or more corner regions 70 where leakage may occur.

As shown in FIG. 7, the shim seal 64 includes a plurality of segments 64A, 64B, 64C, and 64D where each segment is separated from its neighboring segment (e.g., 64A and 64B). In an embodiment, the shim seal 64 may include a gap 68 between neighboring corner regions 70. Accordingly, the shim seal 64 may be comprised of any number of segments, and that the four segment seal of FIG. 7 is merely for illustrative purposes. The small gaps 68 in the shim seal 64 between the corner regions 70 allow the shim seal 64 to accommodate manufacturing and assembly tolerances while sufficiently seating in the plurality of corner regions 70 defined in the seal slot 60 to effectively seal corner leakages via the seal intersection gaps 71 in the corner regions 70.

According to an embodiment, the shim seal 64 (including segments 64A, 64B, 64C, and 64D) and the backup intersegment seal 66 (including segments 66A, 66B, 66C, 66D and 66E) are adapted to move independently of one another. In an embodiment, the shim seal 64, and more particularly the multiple shim seal segments 64A, 64B, 64C, and 64D, substantially seal the corner regions 70 and resultant corner leakage defined by the backup intersegment seal 66, and more particularly defined between neighboring seal segments 66A and 66B, 66B and 66C, 66C and 66D and 66D and 66E). In some particular embodiments, the shim seal 64 has a thickness of approximately 0.0025 millimeters to approximately 1.3 millimeters, and more particularly a thickness of approximately 0.125 mm to 0.4 mm. In an embodiment, the shim seal 64 has a width and overall length substantially equivalent to the width and overall length of the backup intersegment seal 66.

As best illustrated in FIG. 7, the shim seal 64 is disposed on the low-pressure side 72 of the slot 60, and more particularly, a low-pressure side of the backup intersegment seal 66. The shim seal 64 blocks leakage in the corner regions 70 at its critical location (the low-pressure-side 72 of the seal slot 60). The high-pressure side backup intersegment seal 66 serves to seal the gaps 68 in the shim seal 64 and act as a back-up seal in instance that the shim seal 64 is damaged during operation.

The arrangement as disclosed provides a compact, relatively simple seal design that can be at least partially pre-assembled to aid in engine assembly (e.g., numerous seal pieces of the seal assembly 62 may be held together with shrink-wrap, epoxy, wax, or a similar binding material that burns away during engine operation). In alternate embodiments, the seal is assembled in the engine piece-by-piece (i.e. utilizing no binding materials) and may not include any pre-assembly.

In an embodiment, an important aspect of the design implementation of the seal assembly 62 is to minimize a bend radius of the shim seal 64 at the corner regions 70 and/or to match the shim seal 64 bend radius with the seal slot 60 corner blend radius, in order to allow a tighter fit of the shim seal 64 to the low-pressure-side 72 of the seal slot 60. The shim seal 64 typically seals any under-the-seal leakage better than the standard spline seal because it is more conforming; the standard spline seals are typically thicker and more robust against damage. As disclosed herein, the inclusion of both a thin shim seal 64 and thicker backup intersegment seal 66 provides for a conforming seal in conjunction with a thicker more robust backup seal.

Figure 8:
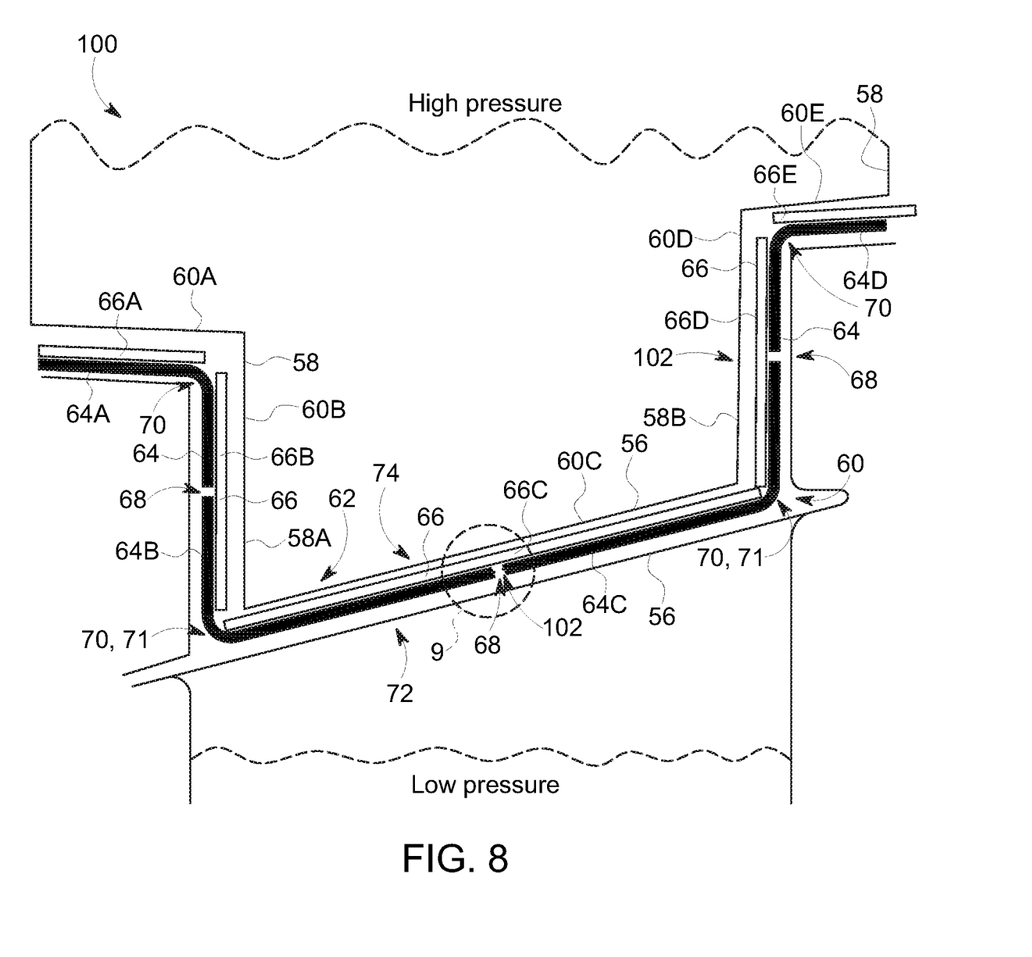
FIG. 8 shows a schematic cross-sectional view of an alternate embodiment of a seal assembly, in accordance with one or more embodiments shown or described herein.
Figure 9:
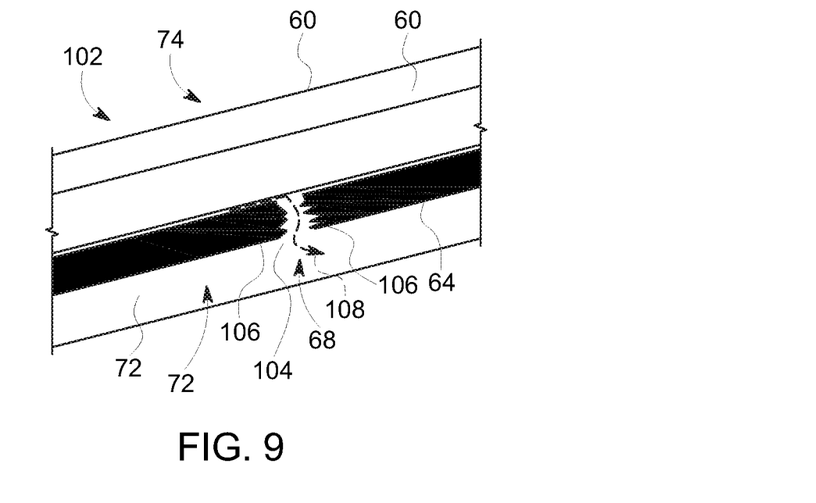
FIG. 9 shows a schematic cross-sectional view of a portion of the seal assembly of FIG. 8 as indicated by dashed line in FIG. 8, in accordance with one or more embodiments shown or described herein.

FIGS. 8 and 9 show an alternate embodiment of a portion of a gas turbine 100 according to an additional embodiment. More particularly, FIG. 8 shows an enlargement of an alternative embodiment of a seal assembly 102 as disclosed herein. FIG. 9 is an enlargement of a portion of the seal assembly 102, as indicated by dashed line 9 in FIG. 8. It is understood that commonly labeled components between the various Figures can represent substantially identical components (e.g., one or more slots 60 comprised of multiple slot segments 60A, 60B, 60C, 60C, 60D, 60E, axial surfaces 56 and radially facing surfaces 58 extending from opposite ends of the axial surfaces 56, etc.). In an embodiment, the turbine 100 includes the seal assembly 102 disposed in slot 60, where the seal assembly 102 contacts the axial surfaces 56, and extends over radially facing surfaces 58 of the slot 60.

Similar to the previous embodiment, the seal assembly 102 includes a shim seal 64 and a backup intersegment seal 66 disposed in the slot 60. The shim seal 64 includes a plurality of segments 64A, 64B, 64C, and 64D, where each segment is separated from its neighboring segment (e.g., 64A and 64B) by a gap 68. The backup intersegment seal 66 includes a plurality of segments 66A, 66B, 66C, 66D, and 66E, where each segment is separated from its neighboring segment (e.g., 66A and 66B) at a corner region 70.

In contrast to the embodiment disclosed in FIGS. 4-7, in the illustrated embodiment of FIGS. 8 and 9, and as best illustrated in FIG. 9, the shim seal 64, includes one or more serrations 104 defined at one or more ends 106 of the plurality of shim seal segments 64A, 64B, 64C, and 64D, and more particularly at one or more of the defined gaps 68 in the shim seal 64. The serrations 104 at the one or more ends 106 provide a tortuous path 108 for leakage at those locations, as compared to the gaps 68 of the embodiment of FIGS. 4-7. It should be understood that although one or more serrations 104 are illustrated and described, any geometry that may be defined at the one or more ends 106 so as to provide a tortuous path for any leakage are anticipated.

Figure 10:
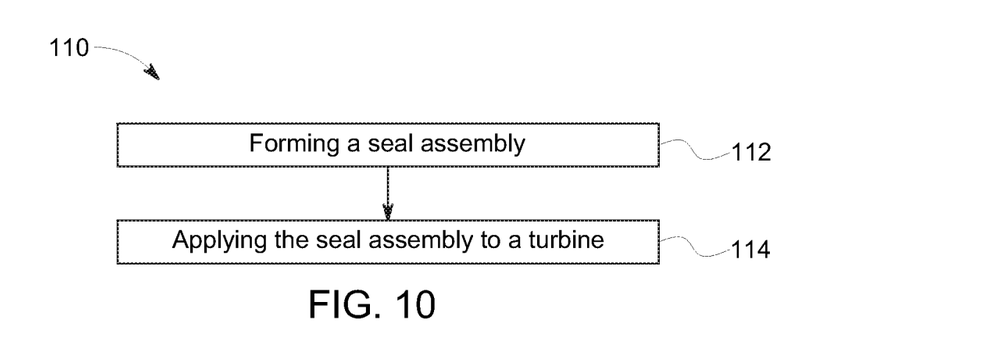
FIG. 10 shows a flow diagram illustrating a method, in accordance with one or more embodiments shown or described herein.

FIG. 10 is a flow diagram illustrating a method 110 of forming a seal in a gas turbine according to various Figures. The method can include the following processes:

Process P1, indicated at 112, includes forming a seal assembly (e.g., seal assembly 62, 102), the forming including providing a shim seal 64 (e.g., segments 64A, 64B, 64C, and 64D) and a backup intersegment seal 66 (e.g., segments 66A, 66B, 66C, 66D, and 66E) (FIG. 6). The shim seal 64 including one or more gaps 68 formed between at least two neighboring shim seal segments 64A, 64B, 64C, or 64D and between corner regions 70.

Process P2, indicated at 114, includes applying the seal assembly 62, 102 (e.g., the shim seal 64 and the backup intersegment seal 66) to a turbine (e.g., gas turbine 502, FIG. 4), where applying includes inserting the seal assembly 64 in a slot 60 such that the backup intersegment seal 66 is on a high-pressure side 74 of the slot 60 and wherein the shim seal 66 is on a low-pressure side 72 of the slot 60. In an embodiment, the backup seal assembly (e.g., seal assembly 62, 102) is disposed adjacent to the axial surfaces 56 and extends over the radially facing surfaces 58 of the slot 60. The shim seal 64 is disposed over the backup intersegment seal 66 and covering the backup intersegment seal 66.

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly to seal a gas turbine hot gas path flow in a gas turbine, the seal assembly comprising:
   a shim seal including, a first shim seal segment, a second shim seal segment, a third shim seal segment, and at least one additional shim seal segment, the shim seal disposed in a slot, on a low-pressure side of the slot, facing a low-pressure side of the gas turbine hot gas path flow, wherein the slot includes a plurality of slot segments,
       wherein each of the first shim seal segment, the second shim seal segment, the third shim seal segment, and the at least one additional shim seal segment define a corner region, wherein the first shim seal segment and the second shim seal segment are separated by a gap defined between their respective corner regions, wherein the second shim seal segment and the third shim seal segment are separated by a gap defined between their respective corner regions, and wherein the third shim seal segment and the at least one additional shim seal segment are separated by a gap defined between their respective corner regions, a backup intersegment seal including a first backup seal segment, a second backup seal segment, a third backup seal segment, a fourth backup seal segment and at least one additional backup seal segment, wherein the backup intersegment seal is disposed in the slot on a high-pressure side of the slot, facing a high-pressure side of the gas turbine hot gas path flow, the backup intersegment seal disposed overlying the shim seal, wherein the first backup seal segment and the second backup seal segment define a seal intersection there between, the seal intersection located at the corner region of the first shim seal segment, wherein the second backup seal segment and the third backup seal segment define a seal intersection there between, the seal intersection located at the corner region of the second shim seal segment, wherein the third backup seal segment and the fourth backup seal segment define a seal intersection there between, the seal intersection located at the corner region of the third shim seal segment, and wherein the fourth backup seal segment and the at least one additional seal segment define a seal intersection there between, the seal intersection located at the corner region of the at least one additional shim seal segment, and wherein the shim seal seals each of the corner regions; and wherein the shim seal and the backup intersegment seal are adapted to move independently of one another.

2. The seal assembly of claim 1, wherein the backup intersegment seal is one of a spline seal, a solid seal, a laminate seal or a shaped seal.

3. The seal assembly of claim 1, wherein the shim seal has a thickness of approximately 0.0025 millimeters to approximately 1.3 millimeters.

4. The seal assembly of claim 1, wherein the shim seal includes features defining a tortuous path for a hot gas path flow leakage.

5. A gas turbine comprising:
a first arcuate component adjacent to a second arcuate component, each arcuate component including one or more slots located in an end face, each of the one or more slots having a plurality of substantially axial surfaces and one or more radially facing surfaces extending from opposite ends of the substantially axial surfaces; and
a seal assembly disposed in the slot of the first arcuate component and the slot of the second arcuate component, the seal assembly comprising:
a shim seal comprising a first shim seal segment, a second shim seal segment, a third shim seal segment, and at least one additional shim seal segment, the shim seal disposed on a low-pressure side of the one or more slots, facing a low-pressure side of the gas turbine hot gas path flow,
wherein each of the first shim seal segment, the second shim seal segment, the third shim seal segment, and the at least one additional shim seal segment define a corner region, wherein the first shim seal segment and the second shim seal segment are separated by a gap defined between their respective corner regions, wherein the second shim seal segment and the third shim seal segment are separated by a gap defined between their respective corner regions, and wherein the third shim seal segment and the at least one additional shim seal segment are separated by a gap defined between their respective corner regions, a backup intersegment seal comprising a first backup seal segment, a second backup seal segment, a third backup seal segment, a fourth backup seal segment and at least one additional backup seal segment, wherein the backup intersegment seal is disposed on a high-pressure side of the one or more slots, facing a high-pressure side of the gas turbine hot gas path flow, overlying the shim seal, wherein the first backup seal segment and the second backup seal segment define a seal intersection there between, the seal intersection located at the corner region of the first shim seal segment, wherein the second backup seal segment and the third backup seal segment define a seal intersection there between, the seal intersection located at the corner region of the second shim seal segment, wherein the third backup seal segment and the fourth backup seal segment define a seal intersection there between, the seal intersection located at the corner region of the third shim seal segment, and wherein the fourth backup seal segment and the at least one additional seal segment define a seal intersection there between, the seal intersection located at the corner region of the at least one additional shim seal segment, and wherein the shim seal and the backup intersegment seal are adapted to move independently of one another.

6. The gas turbine of claim 5, wherein the seal assembly is in contact with the axial surfaces of the one or more slots and extending over the radially facing surfaces of the one or more slots, the seal assembly including:
the backup intersegment seal contacting the axial surface on a high-pressure side of the slot; and
the shim seal disposed over the backup intersegment seal and covering the backup intersegment seal.

7. The gas turbine of claim 5, wherein the backup intersegment seal is one of a spline seal, a solid seal, a laminate seal or a shaped seal.

8. The gas turbine of claim 5, wherein a bend radius of the shim seal is substantially equal to a bend radius of the seal slot in the one or more corner regions.

9. The gas turbine of claim 5, wherein the shim seal has a thickness of approximately 0.0025 millimeters to approximately 1.3 millimeters.

10. The gas turbine of claim 5, wherein the backup intersegment seal has a thickness of approximately 1.016 millimeters to approximately 2.54 millimeters.

11. The gas turbine of claim 5, wherein the shim seal includes one or more serrations defined at one or more ends of the first shim seal segment, the second shim seal segment, the third shim seal segment, and the at least one additional shim seal segment to define a tortuous path through a respective gap for a hot gas path flow leakage.

12. The gas turbine of claim 5, wherein the shim seal substantially seals the corner regions spanning between the axial surfaces and each of the radially facing surfaces.

* * * * *